Dec. 21, 1926.                                           1,611,428
C. FENSKY
NOSE PIECE FOR SPECTACLES
Filed Dec. 24, 1924
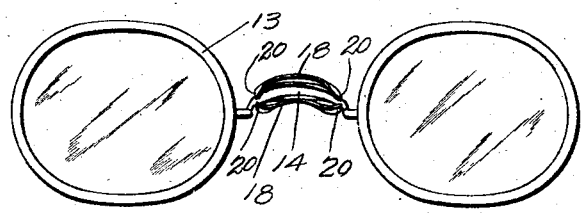
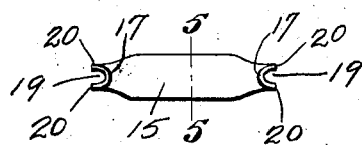 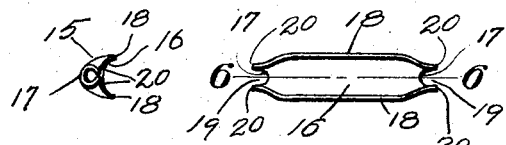
 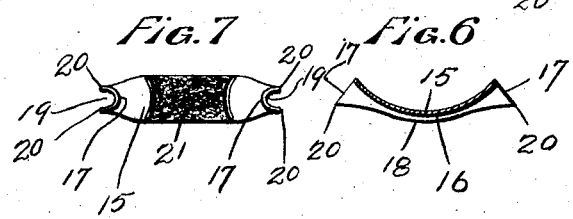
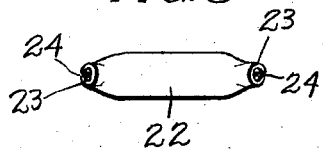 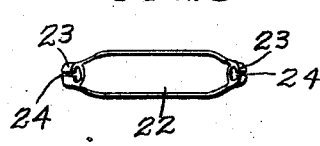
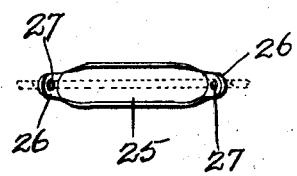  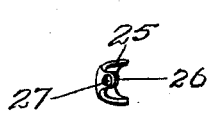
INVENTOR
CHARLES FENSKY
BY Edward E. Longan
ATTY.

Patented Dec. 21, 1926.

1,611,428

UNITED STATES PATENT OFFICE.

CHARLES FENSKY, OF ST. LOUIS, MISSOURI.

NOSE PIECE FOR SPECTACLES.

Application filed December 24, 1924. Serial No. 757,811.

My invention relates to improvements in nose pieces for spectacles and has for its primary object a nose piece adapted to be swingingly secured to the bridge of a pair of spectacles whereby the spectacles will fit automatically on the nose of the wearer without the necessity of bending and adjusting the bridge.

A further object is to construct a nose piece for spectacles which is swingingly carried by the bridge thereof and which will hold spectacles in the proper vertical focal adjustment with the eyes by eliminating the sharp deep crease now formed by the ordinary bridge in the nose of the wearer, which crease has a tendency to prevent the vertical focal adjustment of the lenses to vary necessitating frequent pushing up of the spectacles to get the correct adjustment, and by eliminating this sharp crease the tendency of stretching the bows of the spectacles is also considerably reduced. Heretofore when a pair of spectacles was purchased it was necessary for the oculist or optometrist to bend or twist the bridge of the spectacles so that the same would find approximately a seat on the nose. If this adjustment were not properly done the bridge would either dig into the nose on its upper or lower edge or cause great inconvenience to the wearer. By the use of my device all this adjustment is unnecessary as the nose piece is swingingly mounted on the bridge and can adjust itself to various angles and at the same time has such a broad bearing surface on the nose as to practically eliminate the forming of any groove in the flesh and also eliminate downward slipping to a great extent.

In the drawings:

Fig. 1 is a view of a pair of spectacles with my device attached thereto;

Fig. 2 is an enlarged rear view of my device;

Fig. 3 is an end view of the same showing the manner of closing the ends for securing it to the bridge;

Fig. 4 is a front view of Fig. 2.

Fig. 5 is a vertical section taken on the line 5—5 of Fig. 2 and showing the bridge of a pair of spectacles in position;

Fig. 6 is a longitudinal section on the line 6—6 of Fig. 4;

Fig. 7 is a modified form showing a resilient pad secured to the nose piece;

Fig. 8 is a rear view of a modified form of nose piece;

Fig. 9 is a front view of the same;

Fig. 10 is a view of another modification of my device as employed when installed by the manufacturer;

Fig. 11 is a top plan view of Fig. 10 on a reduced scale showing the same in position on the bridge of a pair of spectacles; and Fig. 12 is an end view of the device shown in Fig. 10.

In carrying out my device I employ a pair of spectacles 13 which are provided with the usual bridge 14, carried by this bridge is my improved nose piece which consists of a strip of material having a back 15, a front 16, ends 17, and side edges 18. The strip comprising my nose piece is concavo-convex both longitudinally and laterally, the back 15 being concave longitudinally and slightly convex laterally, while the face 16 is concave laterally and convex longitudinally. This is to permit the edges 18 to project outwardly from the face 16, the purpose of which will be explained later. The portion of the body or strip adjacent the ends 17 is made more concavo-convex laterally so as to leave substantially U-shaped openings 19. The longitudinal concavity and convexity of the device is made to correspond substantially with the contour of the bridge 14 so that the same will lie therein, as illustrated in Fig. 5.

In attaching my device the same is placed at the rear of the bridge 14 and the points 20 of the ends 17 are then pressed together, as illustrated in Fig. 3, thus substantially surrounding the bridge, but still not sufficiently tight to cause the nose piece to bind thereon. In other words, the nose pieces can swing up and down to a limited degree, this swinging being limited by the edges 18 so that at no time can the nose piece leave the rear of the bridge 14.

If desired, I may place a piece of felt or other resilient material 21 on the rear 15 of the nose piece, this acts as a pad and may be desired by certain users.

In Figs. 8 and 9 I have shown a modified form in which the body portion 22 is concavo-convex both laterally and longitudinally, the ends 23, however, being in the form of a hollow cylinder which is slit as at 24. The device illustrated in these two figures is to be made of resilient material such as rubber, there being sufficient resiliency in the hollow cylindrical portions 23 to permit the bridge 14 to enter through the slits 24 and then spring back into position, thus pivotally securing the device to the bridge.

In Figs. 10 to 12 I have shown a device in which the body portion 25 is concavo-convex both longitudinally and laterally, each end of the body portion being provided with perforated ears 26. These ears have openings 27 formed therethrough, through which the bridge 14 extends. This modification is designed to be placed on the spectacle frames by the manufacturer, and in this instance, the bridge is not flattened out as shown in Fig. 1, but is a continuous piece of round wire. By manufacturing spectacle frames in this manner considerable cost may be saved because outside of bowing the bridge, no other operation on the same are necessary as my device is intended to take care of the usual bridge which at present is flattened out and made concavo-convex laterally so that it will not dig into the nose of the wearer.

The device shown in Figs. 2 to 9 may be attached to any of the present devices and may be either of metal or rubber, as stated. The essential point being that it be attached to the bridge in such a manner as to permit it to automatically and freely adjust itself to the nose of the wearer and at the same time present no sharp edges to the nose which will cause discomfort.

The attaching of my device to a pair of spectacles also, as previously pointed out, eliminates the necessity of the person fitting the glasses to adjust the bridge. This has to be frequently done and in so doing quite frequently the spectacles are broken or are so twisted, the lenses are not in the same plane. In other words, the vertical plane of one lens may be tilted forward or backward and thus destroy the focus of that lens, as well as setting up undue strain on the eye. On account of the automatic adjustment of my improved nose piece, all this is eliminated.

Having fully described my invention, what I claim is:—

1. A nose piece for spectacles comprising an elongated strip of material concavo-convex longitudinally and laterally, the ends of said strip provided with means whereby said strip may be loosely secured to the bridge of a pair of spectacles and to swing freely up and down, said strip having its longitudinal edges bent over and adapted to contact with the edges of the bridge for limiting the upward and downward movement of the nose piece.

2. A nose piece for spectacles comprising the combination with a pair of spectacles of a member concavo-convex both longitudinally and laterally, said member being provided at its ends with projecting points adapted to be bent over whereby the same may be loosely attached to the bridge of said spectacles and on the inside thereof, said concavo-convex strip being so arranged as to rock up and down and freely when attached to the bridge to accommodate itself to the nose of the wearer, and having its longitudinal edges bent over and adapted to contact with the bridge for limiting its up and down movement.

3. In a device of the class described comprising the combination with the bridge of a pair of spectacles, of a strip of material of greater width than said bridge and having its ends bent over the bridge so as to be pivotally attached thereto, said strip being located at the rear of the bridge and having its longitudinal edges bent outward adapted for contact with said bridge, whereby the pivotal movement of said strip is limited.

4. A nose piece for spectacles comprising a strip of material of the same contour but of greater width than the bridge of a pair of spectacles, means integral with the ends and adapted to be bent over said bridge for swingingly securing the same to the rear of the bridge, and means integral with the longitudinal edges of said nose piece for limiting its up and down swinging movement.

In testimony whereof, I have signed my name to this specification.

CHARLES FENSKY.